3,565,887
UNSATURATED AND LONG CHAIN ESTERS OF CYCLODEXTRIN
Stanley M. Parmerter, Wheaton, and Earle E. Allen, Jr., Chicago, Ill., assignors to Corn Products Company, a corporation of Delaware
No Drawing. Filed May 15, 1968, Ser. No. 729,393
Int. Cl. C08b 25/02
U.S. Cl. 260—234
11 Claims

ABSTRACT OF THE DISCLOSURE

Unsaturated and long chain saturated esters of cyclodextrin are disclosed. These esters may be prepared by a process which comprises reacting cyclodextrin with an organic acid in the presence of a strong acid catalyst such as p-toluenesulfonic acid in an apparatus designed for azeotropic removal of water formed during the reaction. The products of the invention may be used as clathrating compounds, as soaps or detergents, as plasticizers for various resins, and in polymerized form as molecular sieves.

---

This invention relates to substituted cyclodextrin compounds. More specifically this invention relates to unsaturated and long chain, saturated esters of cyclodextrin and methods of making them.

Cyclodextrins are well known in the art. Generally speaking, they are a group of homologous oligosaccharides also known as Schardinger dextrins from an early investigator who studied these materials. Investigation has revealed that these compounds are a series of homologous cyclic molecules containing 6 or more α-D glucopyranose units linked together at the 1,4 positions as in amylose. This cyclic molecule may also be referred to as a torus. Stemming from its cyclic arrangement, this torus is characterized by having neither a reducing end group nor a nonreducing end group. For illustrative purposes, the molecule is depicted in the following schematic formula wherein the hydroxyls are shown in the 2,3, and 6 positions in the anhydroglucose units. The letter $n$ may be a number from 4 to 6, or higher.

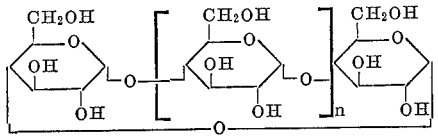

When $n$ is 4, the torus molecule is known as α- cyclodextrin or cyclohexaamylose, because the torus contains six anhydroglucose units; when $n$ is 5, the seven unit member is known as β -cyclodextrin or cycloheptaamylose; and when $n$ is 6, the eight unit member is known as γ -cyclodextrin or cyclooctaamylose. When reference is made herein to "cyclodextrin," it is intended to include the foregoing forms as well as still other tori that have a still larger number of units in the molecule, and, as well, mixtures of these and other homologs.

Cyclodextrin is produced from starch by the action of an enzyme commonly known as cyclodextrin transglucosylase (B. macerans amylase). The source of the enzyme is usually a culture of Bacillus macerans which is grown under conventional conditions on conventional media containing sources of nitrogen, carbon, growth factors ad minerals. The cyclodextrin transglucosylase may be produced by following published teachings such as, for example, those described by D. French in Methods in Enzymology, S. P. Colowick and N. O. Kaplan, editors, Academic Press, N.Y., N.Y., vol. V, 1962, pp. 148–155.

The cyclodextrin transglucosylase activity in cultures of Bacillus macerans may be measured by the Tilden-Hudson procedure as described by these two workers in J. Bacteriol., 43, 527–544, 1942. In general, the cyclodextrin transglucosylase is added to a dilute solution of a gelatinized starch, whereupon a conversion to cyclodextrin occurs by enzymolysis. Procedures for making and isolating the cyclodextrins have been described in the literature, for example, by F. Cramer and D. Steinle, An., 595, 81 (1955). If desired, the various homologs such as, for example, the alpha, beta, and gamma, may be fractionated by procedures such as those described by D. French et al., J. Am. Chem. Soc., 71, 353 (1949).

The various homologous cyclodextrins, having from six to eight units, or higher, and their mixtures, may be used as equivalent materials for the purposes of this invention. In practice, there may be little reason for separating the various fractions, and the cyclodextrin employed may contain a preponderance of β-cyclodextrin, for example. No distinction is intended between the various homologous cyclodextrins or their mixtures unless otherwise indicated, when using the term "cyclodextrin."

The utility of cyclodextrin is well established. For example, cyclodextrin may be used as a clathrating compound. That is to say, it is adapted to form inclusion compounds. It is known to form a variety of crystalline complexes with many organic substances, particularly with organic liquids of low solubility in water. It is also known to form various complexes with neutral salts, halogens, and bases. In referring to the inclusion and clathrating properties, reference is often made to the torus molecule being a host molecule and the included or complexed molecule being the guest molecule. Once given this established use of cyclodextrin, it is understandably desirable to provide novel cyclodextrin structures which may be used in the same way or for other purposes to thereby establish further utility for cyclodextrin as well as novel structures.

SUMMARY OF THE INVENTION

This invention contemplates the formation of several new cyclodextrin structures which may be used as clathrating compounds, as soaps or detergents, as plasticizers for various resins, and, in polymerized form, as molecular sieves.

Basically, the compounds of this invention are unsaturated esters of cyclodextrin and long chain, saturated esters of cyclodextrin. The term "unsaturated esters" is well known in the art and this well known meaning is incorporated herein by reference. The term "long chain, saturated esters" is used herein to designate an ester represented by the formula:

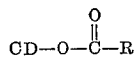

wherein CD is a basic cyclodextrin structure having at least one esterified hydroxyl group, and R is a saturated organic radical having more than 4 straight chain carbon atoms. That is to say, the long chain saturated esters contemplated by this invention are those esters formed of a basic cyclodextrin structure and an ester radical of higher order (longer chain) than valerate.

This invention further contemplates a unique method of making the above-described unsaturated and long chain, saturated esters of cyclodextrin. Basically, this unique method comprises reacting cyclodextrin with an organic acid in the presence of a strong acid catalyst to form an ester and water.

DETAILED DESCRIPTION OF THE INVENTION INCLUDING PREFERRED EMBODIMENTS

As described hereinabove, the compounds contemplated by this invention may basically and accurately be defined as unsaturated esters of cyclodextrin and long chain, saturated esters of cyclodextrin. These compounds may be characterized by the general formula:

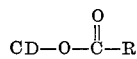

wherein CD is a basic cyclodextrin structure having at least one of its hydroxyl groups esterified as illustrated and R is an organic radical selected from the group consisting of unsaturated organic radicals and saturated organic radicals having more than 4 straight chain carbon atoms (i.e., the radical

is a saturated ester radical of higher order than valerate). This structure thus clearly defines a wide variety of esters, all of which are contemplated by this invention and apparent to one skilled in the art once given the above teachings. As hereinafter set forth, examples of these compounds are best illustrated by describing various constituents which may be used to form them.

Unsaturated and long chain, saturated esters of cyclodextrin may be prepared using conventional techniques. For example, cyclodextrin may be reacted with an acid anhydride in the presence of a base such as pyridine to give an ester and an acid. This reaction may be schematically represented as follows:

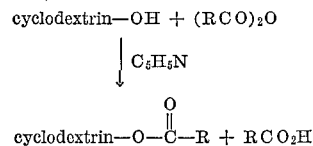

wherein R is defined as set forth above.

Another method by which the unique compounds of this invention can be made is by reacting cyclodextrin with an acid chloride in the presence of a base such as pyridine. This reaction may be schematically represented as follows:

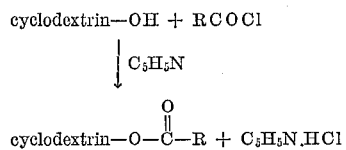

wherein R is defined as set forth above.

In both of these methods the ester of cyclodextrin may be extracted or otherwise separated from the rest of the reaction products by conventional techniques. Further conventional processing may be carried out when desired or necessary.

Although the above-described methods have proved useful for providing a wide variety of esters, an especially preferred method has now been found which may be effectively used to form esters of cyclodextrin generally as well as the esterified compounds as contemplated by this invention. Because of the uniqueness of this method, it forms a part of this invention.

Basically the unique method of esterifying cyclodextrin as contemplated by this invention comprises reacting cyclodextrin with an organic acid in the presence of a strong acid catalyst to thereby form an ester of cyclodextrin. Water is also a product of this reaction. Generally speaking, this unique method is usually performed by first mixing the cyclodextrin in a suitable liquid reaction medium such as benzene and then adding an organic acid and strong acid catalyst to this mixture. In an especially preferred form, the method includes the additional step of azeotropically removing water formed by the reaction while the reaction is in progress. This may be accomplished by using any well known technique such as conventional apparatus designed for this purpose. For example, in practice, a mixture of cyclodextrin, liquid reaction medium, strong acid catalyst, and organic acid is first formed and then continuously stirred and refluxed for a sufficient period of time to form the ester. Azeotropic water removal is conveniently effected by carrying out the reaction, stirring and refluxing under a conventional water trap. The ester formed by this reaction may then be separated from the resulting reaction mixture by conventional techniques and the ester of cyclodextrin resolved in pure form using well known methods.

As stated above, any form of cyclodextrin may be used in this and the other methods. No distinction therefore, is made between the different forms when using the term "cyclodextrin" since it is meant to be used in its generic sense. Examples of specific forms of cyclodextrin are α-cyclodextrin, β-cyclodextrin, γ-cyclodextrin, and mixtures thereof.

Any well known strong acid catalyst may be used in this reaction. A preferred example of these acid catalysts and one which has proved very effective, is p-toluenesulfonic acid.

The organic acids which may be used in this method to form esters of cyclodextrin comprise that group of acids which will esterify hydroxyl groups generally. Such acids are well known in the art. For the sake of convenience and because the invention herein is also concerned with unique esters of cyclodextrin, examples of organic acids which may be used in this method will hereinafter be restricted to those acids which, when reacted with cyclodextrin, will form the unique esters contemplated by this invention. It will, of course, be understood that any organic acid as described above may be used, the restriction of the examples to particular acids being for convenience as well as to set forth the preferred forms.

Generally speaking, the organic acids which are used in this unique method to form the esters contemplated by this invention may broadly be defined as long chain, saturated, organic acids and unsaturated organic acids. The terms "long chain, saturated" and "unsaturated" are defined hereinbove. Examples of these acids include such well known long chain, saturated acids as caproic acid, enanthic acid, caprylic acid, pelargonic acid, capric acid, n-undecylic acid, lauric acid, n-tridecylic acid, myristic acid, n-pentadecylic acid, palmitic acid, margaric acid, stearic acid, n-nonadecylic acid, arachidic acid, n-heneicosoic acid, behenic acid, n-tricosoic acid, lignoceric acid, n-pentacosoic acid, cerotic acid, n-heptacosoic acid, montanic acid, n-nonacosoic acid, melissic acid, n-hentriacentoic acid, n-dotriacontoic acid, n-tetratriacontoic acid, ceroplastic acid, n-hexatetracontoic acid and the like. Some examples of unsaturated acids which may be used are acrylic acid, crotonic acid, vinylacetic acid, obtusilic acid, caproleic acid, lauroleic acid, palmitoleic acid, sorbic acid, linoleic acid, linolelaidic acid, α- and β-eleostearic acid, punicic acid, linolenic acid, and the like. Substituted forms of the above named unsaturated and saturated acids may also be used. It is, of course, realized that the existing acid anhydrides and chlorides of these acids may be used as reactants in the hereinabove described conventional techniques of making the compounds of this invention.

As alluded to hereinabove, the compounds of this invention may be used in a variety of ways. For example, they may be used as plasticizers for various resins and as clathrating compounds in hydrophobic systems. They are also surface active agents and thus may be used to lower the surface tension of water. Such a use is advantageous in the area of soaps and detergents. The unsaturated esters as above described may be used as monomers to form vinyl type polymers or for use in copolymers containing cyclodextrin, polymers and copolymers of this type having well established utility.

The following examples, which constitute the best modes contemplated for carrying out this invention, are for illustrative purposes and are not meant as limitations on the scope of this invention.

EXAMPLE 1

Reaction of cyclodextrin with lauric acid

To a mixture of dry 57 g. of β-cyclodextrin in 450 ml. of dry benzene was added 140 g. of lauric acid and 1.0 g. of p-toluenesulfonic acid. The mixture was stirred and refluxed under a Dean-Stark water trap for 24 hours. The solid was collected and washed thoroughly with anhydrous ether. The white product does not melt up to 305° C., is insoluble in water and is surface active. It contains 8.0% lauroyl corresponding to a D.S. of 0.077. By D.S. is meant the degree of substitution attained during the reaction. This term is well understood in the art and when applied to this invention refers to the average number of hydroxyls esterified per anhydroglucose unit. Where 3 hydroxyls per anhydroglucose unit are present in the torus molecule, the maximum D.S. would be 3.

EXAMPLE 2

Reaction of cyclodextrin with heptanoic anhydride

A solution of 28.4 g. dry β-cyclodextrin, 6.1 g. of n-heptanoic anhydride and 100 ml. of dry pyridine was refluxed for 18 hours. Solid separated during the heating. The mixture was cooled and poured into 3 liters of acetone with stirring. The solid was collected and crystallized from hot methanol. Once it had crystallized it was not longer soluble in hot methanol. The yield was 29.5 g. The melting point of the product was 295°–298° C. The product was sparingly soluble in water and insoluble in acetone. Heptanoyl analysis indicated a D.S. of 0.15.

EXAMPLE 3

Reaction of cyclodextrin and hexanoic anhydride

The general procedure of Example 2 was repeated using 37.6 g. n-hexanoic anhydride, 56.7 g. β-cyclodextrin and 50 ml. pyridine. The mixture was refluxed for four hours. The product was collected and crystallized from hot water. Yield was 40.5 g., M.P. 300° C. Hexanoyl analysis indicated a D.S. of 0.06.

EXAMPLE 4

Reaction of cyclodextrin with crotonic anhydride

The procedure of Example 2 was repeated using 25 g. crotonic anhydride, 45.4 g. β-cyclodextrin and 35 ml. of pyridine. The product melted above 300° C. Crotonyl analysis indicated a D.S. of 0.06.

EXAMPLE 5

Reaction of cyclodextrin with stearoyl chloride

To a solution of 28.4 g. of β-cyclodextrin in 350 ml. of dry pyridine was added 7.6 g. of stearoyl chloride. The mixture was refluxed for 96 hours before 200 ml. of pyridine was distilled. The residual solution was cooled and filtered. Addition of a large volume of acetone to the filtrate gave a solid which was washed with acetone, ether and ethanol. It was digested in boiling water for one hour. The white solid was collected and found to melt at 238°–240° C. Analysis indicated 18.6% stearoyl corresponding to a D.S. of 0.14.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth.

What is claimed is:

1. A compound represented by the formula

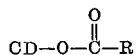

wherein CD is a basic cyclodextrin structure having at least one esterified hydroxyl group and R is an organic radical selected from the group consisting of an unsaturated organic radical and a saturated organic radical having more than 4 straight chain carbon atoms.

2. A compound according to claim 1 wherein the moiety of the ester represented by the formula

is a member selected from the group consisting of lauroyl, heptanoyl, hexanoyl, crotonyl and stearoyl.

3. A compound according to claim 2 wherein the moiety is lauroyl.

4. A method of forming an ester of cyclodextrin represented by the formula

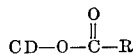

wherein CD is a basic cyclodextrin structure having at least one esterified hydroxyl group and R is a member selected from the group consisting of an unsaturated organic radical and a saturated organic radical having more than 4 straight chain carbon atoms comprising reacting cyclodextrin in a liquid reaction medium with an organic acid in the presence of a strong acid catalyst.

5. A method of forming an ester of cyclodextrin represented by the formula

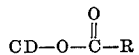

wherein CD is a basic cyclodextrin structure having at least one esterified hydroxyl group and R is a member selected from the group consisting of an unsaturated organic radical and a saturated organic radical having more than 4 straight chain carbon atoms comprising reacting cyclodextrin in a liquid reaction medium with an organic acid in the presence of a strong acid catalyst comprising p-toluene sulfonic acid.

6. A method according to claim 5 which also includes the step of azeotropically removing water formed during the reaction while the reaction is in progress.

7. A method according to claim 6 which also includes the step of separating the ester formed by said reaction from the mixture after the ester is formed.

8. A method according to claim 7 which includes the steps of stirring and refluxing said mixture which comprises cyclodextrin, liquid reaction medium, p-toluene sulfonic acid and lauric acid while said reaction is in progress.

9. A method according to claim 8 wherein said liquid reaction medium comprises benzene.

10. A method for forming an ester of cyclodextrin which has a melting point greater than 305° C., is insoluble in water, is surface active and contains 8.0% lauroyl corresponding to a degree of substitution of 0.077 which comprises forming a premixture of β-cyclodextrin and benzene, adding to said premixture lauric acid and p-toluenesulfonic acid, stirring and refluxing the resulting mixture for a sufficient period of time to form a solid ester product, separating said solid product from said mixture and purifying said product.

11. A method according to claim 10 wherein said mixture is formed of 57 parts by weight β-cyclodextrin, 140 parts by weight lauric acid, and 1 part by weight p-toluenesulfonic acid, said stirring and refluxing is carried out under a water-trap for at least 24 hours and solid product after separation from said reaction mixture is washed with anhydrous ether to purify it.

References Cited
UNITED STATES PATENTS

| | | | |
|---|---|---|---|
| 2,700,022 | 1/1955 | Clayton et al. | 260—234 |
| 2,831,855 | 4/1958 | Martin | 260—234 |
| 2,868,781 | 1/1959 | Gaertner et al. | 260—234 |
| 2,954,372 | 9/1960 | Novak | 260—234 |
| 3,140,184 | 7/1964 | Robbins | 260—234 |
| 3,198,784 | 8/1965 | Griscom et al. | 260—234 |

LEWIS GOTTS, Primary Examiner

J. R. BROWN, Assistant Examiner

U.S. Cl. X.R.

210—24; 252—89, 108; 260—2